Figure 1:
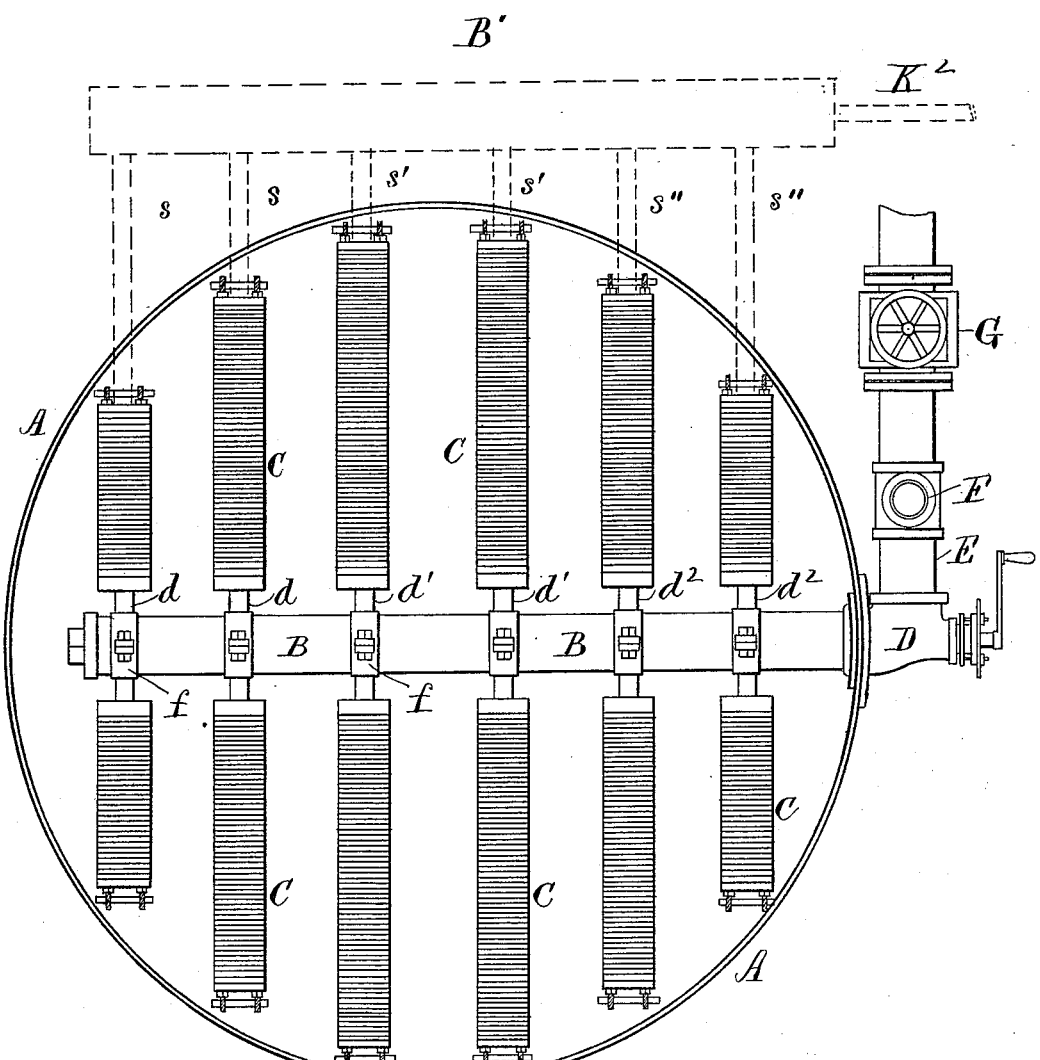

(No Model.) 3 Sheets—Sheet 1.
J. W. HYATT.
VALVE MECHANISM FOR WASHING FILTER BEDS.
No. 402,738. Patented May 7, 1889.

Attest:
L. Lee.
H. J. Miller

Inventor.
John W. Hyatt, per
Crane & Miller, Attys.

(No Model.) 3 Sheets—Sheet 2.
J. W. HYATT.
VALVE MECHANISM FOR WASHING FILTER BEDS.
No. 402,738. Patented May 7, 1889.
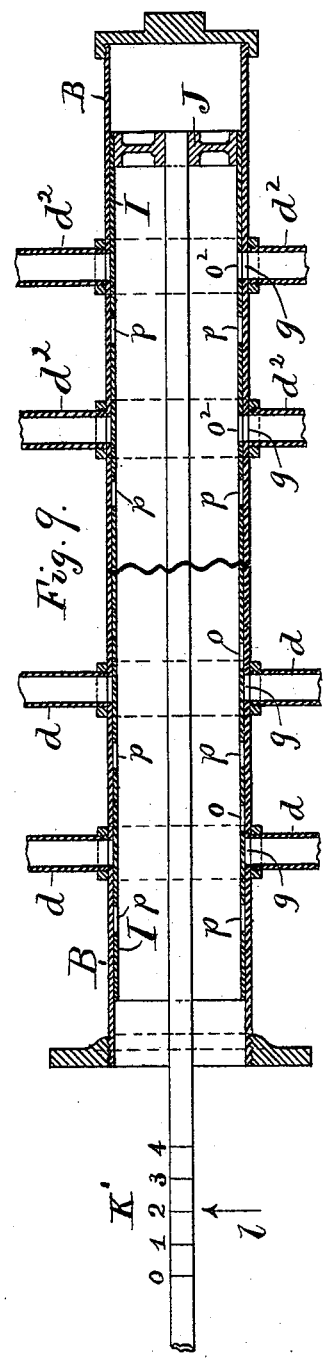
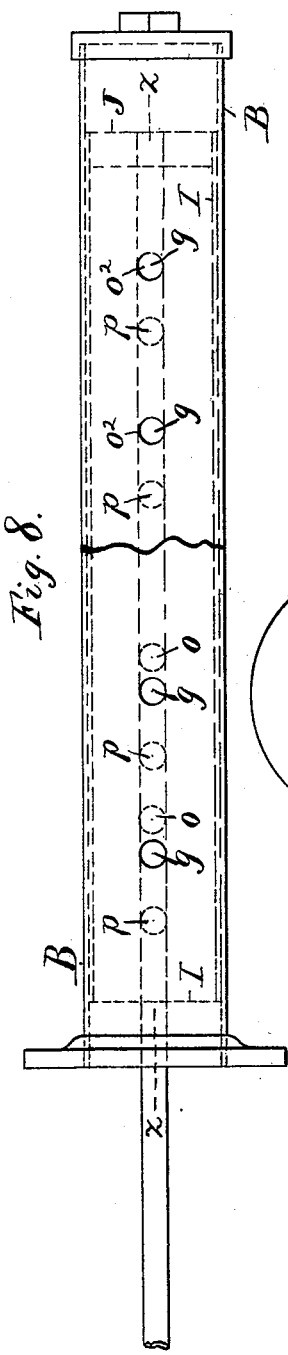
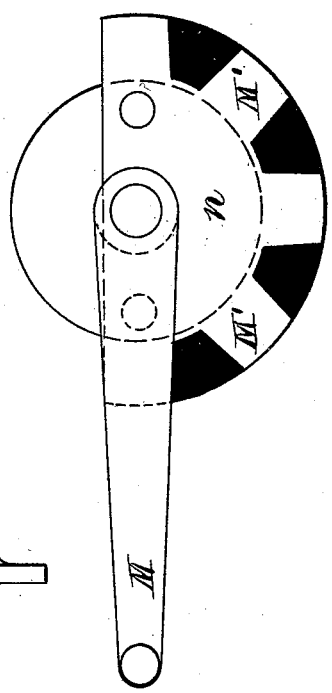
Attest:
L. Lee.
F. C. Fischer.
Inventor.
John W. Hyatt, per
Crane & Miller, Att'ys (No Model.) 3 Sheets—Sheet 3.
J. W. HYATT.
VALVE MECHANISM FOR WASHING FILTER BEDS.
No. 402,738. Patented May 7, 1889.
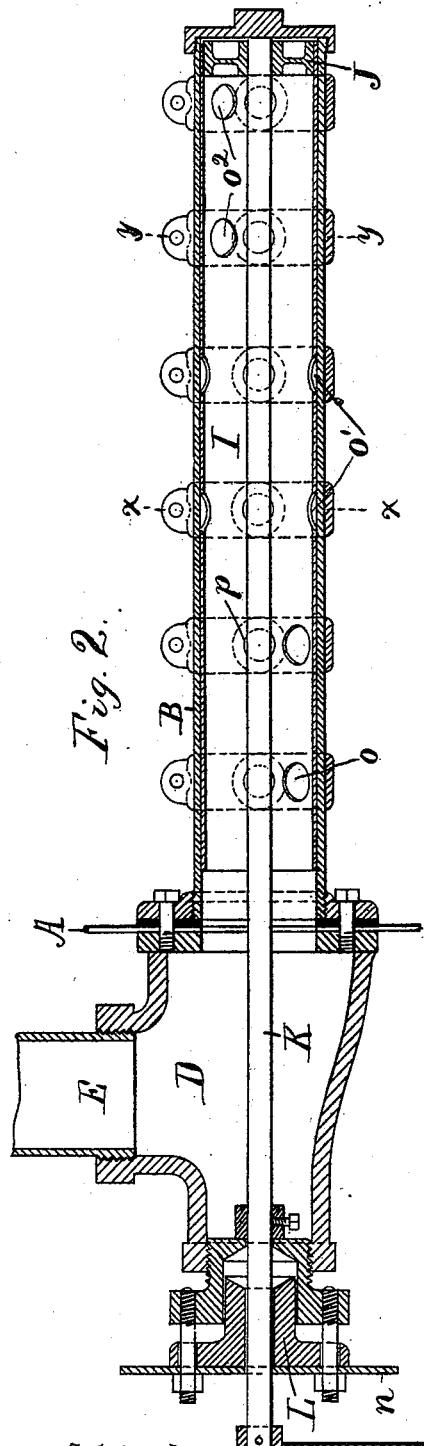
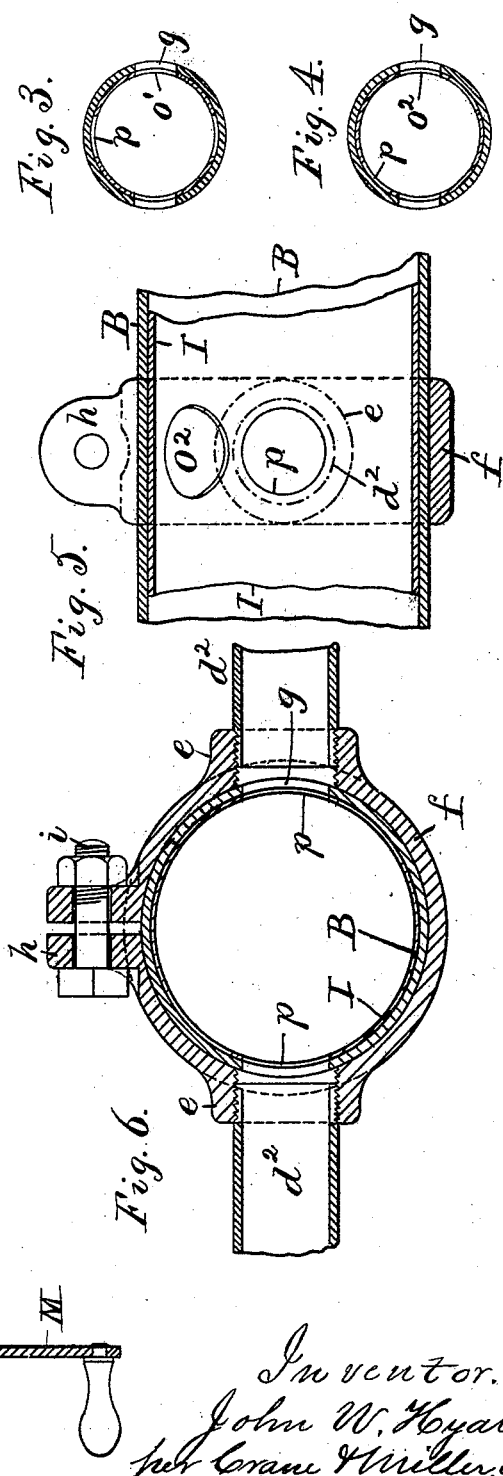
Attest:
L. Lee.
F. C. Fischer.
Inventor.
John W. Hyatt,
per Crane & Miller, Attys.

UNITED STATES PATENT OFFICE.

JOHN W. HYATT, OF NEWARK, NEW JERSEY.

VALVE MECHANISM FOR WASHING FILTER-BEDS.

SPECIFICATION forming part of Letters Patent No. 402,738, dated May 7, 1889.

Application filed June 15, 1888. Serial No. 277,243. (No model.)

*To all whom it may concern:*

Be it known that I, JOHN W. HYATT, a citizen of the United States, residing at Newark, Essex county, New Jersey, have invented certain new and useful Improvements in Valve Mechanism for Washing Filter-Beds, fully described and represented in the following specification and the accompanying drawings, forming a part of the same.

This invention relates to filters having several series of outlet-strainers connected with a common trunk or header; and it consists in a special means for connecting any or all of such strainers at pleasure with the interior of such trunk.

The construction is especially adapted for application to a trunk located within a filter-casing, as the means for connecting the strainers with such trunk consists in a sleeve movable within the trunk, and which need not therefore be adapted to make an air-tight joint with such trunk, as any leakage would occur wholly within the filter-casing, and would not impair the operation of the filter.

The device is especially intended for use in a filter having several sets of outlet-strainers, for washing a filter-bed of granular material in sections by reversing a current of water through a portion of such strainers at one time.

The construction will be understood by reference to the annexed drawings, in which—

Figure 1 is a plan of a filter-casing containing twelve outlet-strainers connected with a central trunk. Fig. 2 is a longitudinal vertical section of the trunk. Fig. 3 is a transverse section of the trunk and sleeve on line $x\ x$ in Fig. 2. Fig. 4 is a similar section on line $y\ y$ in Fig. 2. Fig. 5 is an enlarged sectional view of the trunk adjacent to the line $y\ y$ on the same section-plane as Fig. 2, and Fig. 6 is a transverse section on line $y\ y$ in Fig. 2, with the clamps and strainer-pipes attached. Fig. 7 is an end view, upon a larger scale, of the dial and crank shown in Fig. 2, with the parts in the same position. Fig. 8 is a side view of a trunk with the clamps removed and a sleeve adapted to longitudinal movement, and Fig. 9 is a section of the same on line $z\ z$ in Fig. 8.

In Fig. 1, A is the filter-casing; B, the trunk for conveying water to and from the strainers C, twelve of such strainers being shown connected with the trunk, in six couples, by pipes $d$, $d'$, and $d^2$, screwed into sockets $e$ in clamp-collars $f$, which are fitted tightly to the exterior of the sleeve and clamped thereon by lugs $h$ and bolts $i$. The strainers are formed of alternate fixed and movable collars, as claimed in another patent application, No. 277,244, filed herewith; but my invention is applicable to any form of strainers or filter-outlets whatsoever. The trunk is shown connected by an elbow, D, with a pipe, E, containing a T, F, and a cock, G.

In washing a filter-bed by a reverse current, it is common to connect such a T with a water-supply pipe and to introduce the water through the same into the outlet-strainers, the outlet-cock G being then closed, while the water would be cut off from such T during the process of filtration, and the fluid, escaping from the filter-bed through the strainers, would make its exit from the pipe E through the cock G.

The essential part of my invention so far as it relates to the trunk consists in making the trunk and sleeve cylindrical, so that the same may be cheaply formed of smooth commercial drawn pipes, to avoid the expense of turning up and fitting together brass castings, the leakage between the adjacent surfaces of such commercial drawn pipes being immaterial in my invention.

The essential part of the invention in relation to the trunk and to the filter-strainers consists in distributing the water-current, when reversed, to any particular section of strainers within the filter-bed by a single movement of the sleeve within the trunk.

I am fully aware that it is common to construct tapering valve-plugs with a variety of passages adapted to connect different ports when the plug is placed in various positions, and I do not therefore claim, broadly, any system of ports or passages in a trunk or cock.

The sleeve may be rotated or moved longitudinally within the trunk to effect such opening of the apertures, the former construction being shown in Figs. 2 to 5, inclusive, and the latter construction in Figs. 8 and 9.

$g$ are the apertures in the trunk, shown in Fig. 6 coincident with the pipes $d^2$.

In Fig. 2 the sleeve I is shown attached, by means of a head, J, to the end of a rod, K, which is extended through a stuffing-box, L, and provided with a crank-handle, M. The trunk is shown with six apertures, corresponding to the six strainers, upon one side thereof, in Fig. 1, and four sets of openings, $o$, $o'$, $o^2$, and $p$, are shown in the sleeve. The openings $p$ are six in number and arranged in the figure in line with the apertures in the trunk, to connect all the strainers with the elbow D and outlet-pipe E, as when the filtered fluid is escaping through the strainers. The other openings are arranged in pairs, the openings $o$ at one side of the openings $p$ being forty-five degrees distant, the openings $o^2$ ninety degrees from the openings $p$, and the openings $o^2$ upon the opposite side of the openings $p$ forty-five degrees distant. The rotating of the sleeve forty-five degrees in one direction thus closes all the openings except the openings $o$, and disconnects all the strainers from the interior of the trunk except those connected by the pipes $d$. The rotation of the sleeve ninety degrees (illustrated by the section in Fig. 3) closes all the apertures $g$, except the openings $o'$, connecting with the pipes $d'$.

The rotation of the sleeve one hundred and thirty-five degrees, as illustrated in Fig. 4, closes all the apertures except those opposite the openings $o^2$, communicating with the pipes $d^2$. The section in Fig. 2 shows only one half the trunk; but the other half may be constructed and operated to open and close the similar connections upon the opposite side of the trunk by a farther rotation of the sleeve through the required arc. An index, $n$, is attached to the gland of the stuffing-box L and marked, as shown in Fig. 7, with divisions M', or in any other suitable manner, to indicate, when the crank M is turned, when the proper holes coincide with the pipes leading to the strainers.

As will be noticed in Fig. 1, the crank and stuffing-box are located outside of the filter-casing, being arranged upon the elbow D, and thus afford a means of directing a current of fluid into any particular section of strainers.

The trunk in Figs. 8 and 9 is shown broken at the middle and provided with only four strainer-pipes, $d$ and $d^2$, at each side, as the sleeve is constructed to operate by a longitudinal movement and would require too much room upon the drawings if shown in connection with six apertures. The rod is shown provided with an index, K', and a pointer, $l$, the marks upon the index being numbered, respectively, 0 1 2 3 4. The sleeve is shown with three sets of openings, $p$, $o$, and $o^2$, and the openings $o^2$ are arranged to coincide with the apertures $g$, so as to connect the pipes $d^2$ with the interior of the trunk. The pointer with such adjustment coincides with the mark 2 upon the index, and the openings $o$ are arranged a little to the right of the apertures leading to the pipes $d$, and would coincide therewith if the mark 3 upon the index were moved to the pointer. Upon the contrary, the movement of the sleeve to the right until the mark zero were opposite the pointer would cause all the openings $p$ to coincide with the apertures $g$, as would be required during the filtering operation.

The index and pointer are not shown in connection with the elbow D, as their construction is immaterial, and it is obvious that the rod may be readily moved lengthwise by suitable means, instead of having the crank M applied to its end to rotate it, as shown in Fig. 2. By such constructions as I have described it is obvious that the water may be delivered from the filter from all the strainers during the filtering operation, and the reverse current, applied to the trunk during the operation of washing the filter, may be directed into any of the sections at pleasure by adjusting the sleeve in the trunk in the desired manner. It is also obvious that a little leakage through any of the joints between the sleeve and the trunk or the admission of a little fluid to any of the strainers would cause no loss of water, as the leakage would occur wholly within the filter, and the device may therefore be constructed by putting one smooth-drawn brass pipe within another and avoiding all the expense of making tight or close joints.

It is obvious that the relation of the sleeve and trunk to the strainers would be the same if the sleeve and trunk were arranged outside of the filter-casing and connected by suitable pipes with strainers arranged within the same, as any leakage of the joints would deliver the water wholly within the filter and cause no loss of fluid. Such an arrangement is indicated in dotted lines upon the upper side of Fig. 1, the trunk being shown at B', the rod for operating the sleeve being shown at K², and the pipes connecting with the several strainers through the casing A being indicated by the letters $s$, $s'$, and $s^2$.

It will be noticed in Fig. 1 that the twelve outlet-strainers are connected in pairs with the trunk by the pairs of holes $o$ $o$ $o'$ $o'$ $o^2$ $o^2$; but it is obvious that the construction may be modified to divide the entire number of strainers within the filter into any number of groups, or to connect each of such strainers in turn with the interior of the trunk.

My construction, for the trunk and sleeve, of smooth cylindrical pipes fitted together without turning, with the apertures arranged as shown herein, may obviously be used in other filter constructions than that which I have described.

I am aware that it is old to clamp collars upon a trunk to form a pipe-connection, as such is the usual method of tapping cement-lined water-pipes, and I do not, therefore, make any claim to the collars $f$ shown herein, except in connection with the apertures $g$ and $o$, formed, respectively, in the trunk and sleeve and operated as herein set forth.

Having thus set forth my invention, I do not limit myself to the particular construction shown herein, but claim my device as follows:

1. The combination, with a filter casing or receptacle containing several outlet-strainers, of a trunk or header having a series of apertures connected, respectively, with the several strainers inside the filter-casing, and a movable sleeve fitted within the trunk and provided with a series of openings adapted to connect such strainers in turn with the interior of the trunk, as and for the purpose set forth.

2. The combination, with a filter-receptacle containing several outlet-strainers arranged and operated to wash the filter-bed by a reversed current, of a trunk or header having a series of apertures connected, respectively, with the several strainers inside the filter-casing, and a movable sleeve fitted within the trunk and provided with one series of openings to connect all the strainers at once with the interior of the trunk, and with another series of openings adapted to connect such strainers or groups of strainers in turn with the interior of the trunk during the washing operation, as and for the purpose set forth.

3. The combination, with a filter casing or receptacle containing several outlet-strainers, of a trunk or header having a series of apertures connected, respectively, with the several strainers inside the filter-casing, a movable sleeve fitted within the trunk and provided with a series of openings adapted to connect such strainers in turn with the interior of the trunk, a rod extended outside the trunk to move the sleeve, and an index to show the adjustment of the rod, as and for the purpose set forth.

In testimony whereof I have hereunto set my hand in the presence of two subscribing witnesses.

JOHN W. HYATT.

Witnesses:
FRANK L. MORTON,
THOS. S. CRANE.